(12) United States Patent
Voss et al.

(10) Patent No.: US 10,817,438 B2
(45) Date of Patent: Oct. 27, 2020

(54) SAFETY ARRANGEMENT

(71) Applicant: WAGO Verwaltungsgesellschaft mbH, Minden (DE)

(72) Inventors: Christian Voss, Minden (DE); Andreas Patzelt, Bünde (DE); Christopher Wohlgemuth, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/073,391

(22) PCT Filed: Jan. 26, 2017

(86) PCT No.: PCT/EP2017/051632
§ 371 (c)(1),
(2) Date: Jul. 27, 2018

(87) PCT Pub. No.: WO2017/129671
PCT Pub. Date: Aug. 3, 2017

(65) Prior Publication Data
US 2019/0065411 A1    Feb. 28, 2019

(30) Foreign Application Priority Data
Jan. 27, 2016   (DE) .................. 10 2016 201 141

(51) Int. Cl.
*G06F 21/60* (2013.01)
*G06F 13/12* (2006.01)
(Continued)

(52) U.S. Cl.
CPC ............. *G06F 13/122* (2013.01); *G05B 9/02* (2013.01); *G06F 11/2221* (2013.01);
(Continued)

(58) Field of Classification Search
CPC ............................ G06F 21/606; G06F 11/2221
See application file for complete search history.

(56) References Cited

U.S. PATENT DOCUMENTS 4,498,169 A * 2/1985 Rozmus ............. H04L 12/2801
370/432
4,791,643 A * 12/1988 Molstad ............. G11B 20/1809
714/762
(Continued)

FOREIGN PATENT DOCUMENTS

DE          1100629 C1      8/1992
DE        44 25 254 A1      1/1996
(Continued)

OTHER PUBLICATIONS

International Search Report and Written Opinion dated Apr. 12, 2017 in International Application No. PCT/US2017/051632.

*Primary Examiner* — Farley Abad
(74) *Attorney, Agent, or Firm* — Muncy, Geissler, Olds & Lowe, P.C.

(57) ABSTRACT

The present invention relates to a security arrangement comprising a data processing unit for serial transmission of data for controlling outputs and for querying inputs of a process and a corresponding method; further comprising at least one parallel-to-serial converter comprising a shift register for converting data to query the inputs; at least one serial-to-parallel converter comprising a shift register for converting data to control the outputs; wherein the data to be transmitted includes diagnostic bits that are output from the serial-to-parallel converter and read back from the parallel-to-serial converter; and the read-back data is checked for errors by the data processing unit to ensure a secure data transmission.

14 Claims, 2 Drawing Sheets

Figure 1:
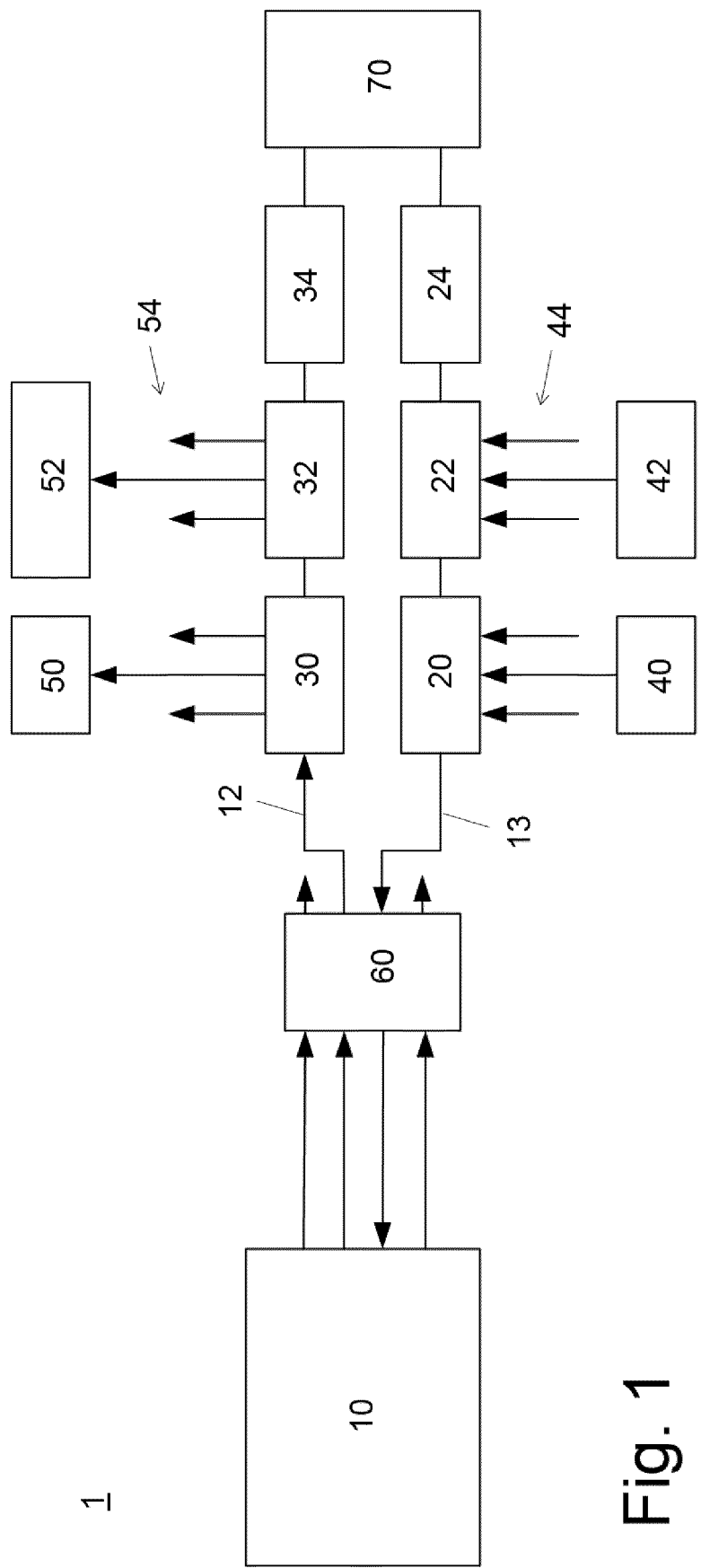

(51) Int. Cl.
  *G06F 13/42* (2006.01)
  *G05B 9/02* (2006.01)
  *G06F 11/22* (2006.01)
  *G05B 19/048* (2006.01)
  *G06F 11/00* (2006.01)

(52) U.S. Cl.
  CPC ...... *G06F 13/4221* (2013.01); *G06F 13/4282* (2013.01); *G06F 13/4291* (2013.01); *G06F 21/606* (2013.01); *G05B 19/048* (2013.01); *G06F 11/00* (2013.01)

(56) References Cited

U.S. PATENT DOCUMENTS

| | | | | |
|---|---|---|---|---|
| 5,734,682 A | * | 3/1998 | Lukac-Kuruc | G10H 1/0066 341/57 |
| 5,930,271 A | * | 7/1999 | Takahashi | G01R 31/31813 714/738 |
| 6,201,829 B1 | * | 3/2001 | Schneider | H04L 1/244 375/221 |
| 6,574,760 B1 | * | 6/2003 | Mydill | G01R 31/287 324/762.02 |
| 7,814,554 B1 | * | 10/2010 | Ragner | G06F 21/52 713/165 |
| 2002/0035414 A1 | | 3/2002 | Morikawa et al. | |
| 2002/0095542 A1 | * | 7/2002 | Brugger | G06F 13/4068 710/316 |
| 2003/0216841 A1 | * | 11/2003 | Hashimoto | F02D 41/2425 701/1 |
| 2010/0287425 A1 | * | 11/2010 | Mattern | G11C 29/10 714/718 |
| 2014/0320138 A1 | * | 10/2014 | Acharya | H01H 47/002 324/415 |

FOREIGN PATENT DOCUMENTS

| | | |
|---|---|---|
| DE | 102009016972 B4 | 10/2010 |
| DE | 102009022389 A1 | 12/2010 |
| DE | 19947501 A1 | 5/2011 |
| DE | 102011052095 A1 | 1/2013 |
| DE | 102011117896 A1 | 5/2013 |
| DE | 102014110017 A1 | 1/2016 |
| EP | 2 645 638 A1 | 10/2013 |
| EP | 2 738 990 A1 | 6/2014 |
| EP | 2787407 | 10/2014 |

* cited by examiner

SAFETY ARRANGEMENT

This application is a 371 National Phase of PCT Application No. PCT/EP2017/051632, filed on Jan. 26, 2017; and this application claims priority of Application No. DE 10 2016 201 141.3 filed in Germany on Jan. 27, 2016, and which is herein incorporated by reference in its entirety.

1. FIELD OF THE INVENTION

The present invention relates to a security arrangement comprising a data processing unit for serial transmission of data for controlling inputs and outputs of a process.

2. PRIOR ART

In security relays for security-critical applications, inputs and outputs are usually galvanically isolated controlled via optocouplers. Thereby, the optocouplers transmit digital data for controlling the circuits of the control circuit of the sensors and actuators.

In the prior art it is known to use for each input and output in each case a galvanic separating element, e.g. a separate optocoupler. Security relays with many inputs and outputs therefore require a corresponding space solely for the large number of optocouplers on their board. In addition, the number of required optocouplers is a cost factor.

It is therefore the problem to provide a security arrangement that requires, despite the high security requirements, less galvanic separation units and thus has a smaller footprint. In addition, the security of the data transmission of the system should be ensured.

3. SUMMARY OF THE INVENTION

The above problems are solved by a security arrangement for controlling inputs and outputs of a process according to the present invention and by a method for serial transmission of data for controlling inputs and outputs of a process according to the present invention.

In particular, a security arrangement comprises a data processing unit for serial transmission of data for controlling outputs and for querying inputs of a process, and furthermore at least one parallel-to-serial converter comprising a shift register for converting data to query the inputs, at least one serial-to-parallel converter comprising a shift register for converting data to control the outputs, wherein the data to be transmitted includes diagnostic bits that are output from the serial-to-parallel converter and read back from the parallel-to-serial converter, and the data read back from the data processing unit are checked for errors to ensure a secure data transmission.

To save space for the galvanic isolation or to use data processing units, such as micro-controllers, with a small number of connection pins, the invention uses at least one serial-to-parallel converter with a shift register or at least one parallel-to-serial converter with a shift register, respectively. The advantage of these converters with a shift register is that only a few control signals for the respective converter are necessary. These few control signals can be conducted in the ideal case via only a single galvanic separating element, wherein the galvanic separating element may be a digital isolator or an optocoupler. This significantly saves the number of galvanic separating elements and thus space on the board of the security arrangement and component costs.

In this case, a serial data transmission path is formed, in which the data processing unit preferably transmits the control data for the inputs and outputs via the galvanic separating element to the at least one serial-to-parallel converter and reads it from the at least one parallel-to-serial converter.

However, a serial data transmission path places increased demands on the security of the data transmission, in particular in the case of security-related devices. Therefore, it is proposed according to the invention to insert into the data to be transmitted diagnostic bits which are output from the serial-to-parallel converter and read back from the parallel-to-serial converter. This allows that the data read back is checked for errors by the data processing unit in order to ensure a secure data transmission. If the diagnostic bits read back correspond to the expected, correct diagnostic bits, it can be assumed with great certainty that the entire data transmission has taken place without errors. If the diagnostic bits read back do not match the expected, correct diagnostic bits, there is a disturbed data transmission or a defect in the transmission chain, which the data processing unit can recognize and put the system in a secure state. Overall, it is thus possible to ensure the data security of the security arrangement and of the overall system with high certainty, as it is required for security-critical applications.

Preferably, the security arrangement further comprises a coupling unit, which is connected downstream of the data processing unit. The coupling unit preferably comprises a galvanic separating element. The galvanic separating element may preferably comprise at least one digital isolator or one optocoupler. An optocoupler e.g. transmits data by optical means and therefore provides a perfect galvanic separation of the data transmission.

Preferably, the data processing unit is a security controller. The security arrangement is preferably used in security-critical applications that are controlled by a special security controller. In such applications or security relays, the error models described in the standards EN ISO 13849, DIN EN 61508 or DIN EN 62061 must be adopted and handled safely for the circuit. The security arrangement is able to comply to these standards.

Preferably, the security arrangement comprises a plurality of serially-connected serial-to-parallel converters and/or a plurality of serially-connected parallel-to-serial converters. The security arrangement is scalable in size as needed and can be adapted to a number of inputs and outputs.

Preferably, the diagnostic bits represent a test pattern of bits. Characteristic test patterns of bits make it easy to identify the diagnostic bits in the data stream and distinguish them from the user data. In addition, the provisioning of test patterns of the diagnostic bits enhances security, as these test patterns have multiple bits and are scalable in length to provide a required level of security.

The diagnostic bits, in particular the test patterns, are preferably output at different bit positions of a serial data stream. The security arrangement uses with its shift registers to control the inputs and outputs preferably an SPI interface (Serial Peripheral Interface) with which digital circuits can be easily connected to each other. An ordinary serial data stream is preferably supplemented with diagnostic bits and test patterns, respectively, wherein the diagnostic bits and test patterns, respectively, can be inserted at different bit positions of the serial data stream. These different bit positions continue to increase data security, since the data stream can be tested for correctness at dynamically different bit positions. Accordingly, the diagnostic bits and test patterns, respectively, can be read in also at different bit positions in the data stream of the parallel-to-serial converters.

The diagnostic bits, in particular the test patterns, are preferably read in inverted by the parallel-to-serial converters. An inversion of the output of diagnostic bits is used to detect errors, such as short circuits for example. If there is no inversion when reading in the diagnostic bits, an error must be present and can thus be detected.

The diagnostic bits, in particular the test patterns, are preferably changed dynamically. The use of varying different diagnostic bits and test patterns further increases the security of the data transmission while at the same time quickly detecting errors. Preferably, the diagnostic bits, in particular the test patterns, are changed dynamically for each transmission cycle of the security arrangement.

Preferably, the data processing unit is adapted to perform a comparison of the diagnostic bits, in particular the test patterns, against an expected value and to initiate a secure state of the process when an error is detected. The data processing unit uses an expected value to check the diagnosis bits and test patterns, respectively. If the data processing unit detects an error, it can transfer the process to a secure state.

Preferably, the data processing unit is adapted to perform the comparison of the diagnostic bits, in particular the test patterns, against an expected value by means of direct memory accesses, in particular DMA transfers, within the data processing unit.

Preferably, a DMA controller of the data processing unit carries out the transfer of the diagnostic bits, in particular of the test patterns, in order to check the test patterns against an expected value in a further step. The interrupt load is reduced by the DMA transfer because an interrupt is not triggered for every date that is transmitted, but only when a complete transmission of several data has taken place. This reduces the interrupt load of the data processing device and overall increases the performance of the security arrangement.

Preferably, each of the serial-to-parallel converters outputs diagnostic bits, in particular a test pattern, and/or each of the parallel-to-serial converters reads back diagnostic bits, in particular a test pattern. Thus, the data transmission per transmission cycle can be checked several times, which in turn increases the security of data transmission. In each case, a serial-to-parallel converter is preferably assigned to a specific one of the parallel-to-serial converters. This uniformly distributes the diagnostic bits, in particular the test patterns, to the corresponding converters and increases the probability of detection of faults and defects of blocks within the transmission link.

The above-mentioned problem is also solved by a method for serial transmission of data for controlling outputs and for querying inputs of a process, comprising the following steps:
 a. serial transmission of data for controlling outputs and for querying inputs of a process by means of a data processing unit;
 b. converting data to query the inputs by means of at least one parallel-to-serial converter comprising a shift register;
 c. converting data to control the outputs by means of at least one serial-to-parallel converter comprising a shift register;
 d. reading back the data that is output from the serial-to-parallel converter by means of the parallel-to-serial converters, wherein the data to be transmitted contains diagnostic bits; and
 e. error checking of the read back data by means of the data processing unit in order to ensure a secure data transmission.

Using this method can significantly save the number of galvanic separation elements and thus space on the board of the security arrangement and the corresponding component costs. At the same time, the data security of the security arrangement and of the overall system is ensured with high certainty, as it is required for security-critical applications.

Preferably, the diagnostic bits are transmitted as test patterns and changed dynamically. The use of changing test patterns further increases the security of data transmission.

The diagnostic bits, in particular the test patterns, are preferably output at different bit positions of a serial data stream and/or output in an inverted manner. In addition, the bit position of the diagnostic bits, in particular the test patterns, can also be defined in the serial data stream.

4. BRIEF DESCRIPTION OF THE DRAWINGS

Figure 2:
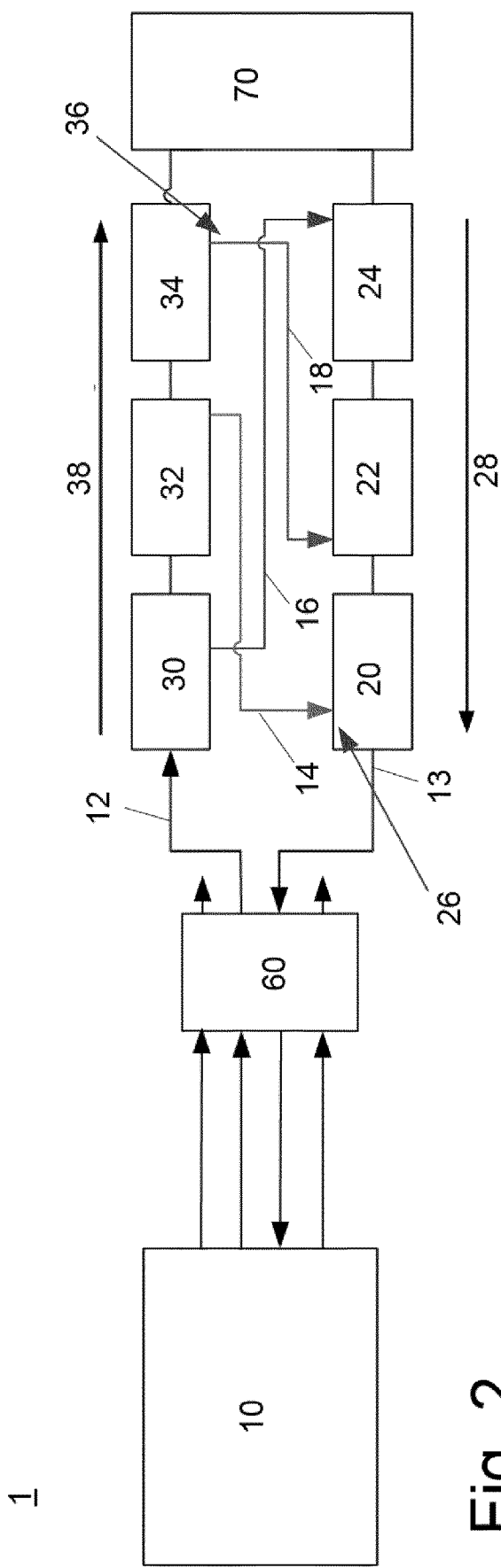

In the following, preferred embodiments of the present invention will be described with reference to the drawings. In which shows:

FIG. 1 a schematic diagram of a security arrangement for controlling outputs and querying inputs; and FIG. 2 the schematic diagram of FIG. 1 when outputting and reading back diagnostic bits.

5. DESCRIPTION OF PREFERRED EMBODIMENTS

In the following, preferred embodiments of the present invention will be described in detail with reference to the drawings.

FIG. 1 shows an embodiment of a security arrangement 1 for controlling inputs 40, 42 and outputs 50, 52 of a security-critical process, not shown. The security arrangement 1 comprises a data processing unit 10, a coupling unit 60, three serial-to-parallel converters 30, 32, 34, an analog-to-digital or digital-to-analog converter 70, three parallel-to-serial converters 20, 22, 24, inputs 40, 42 and outputs 50, 52.

The security arrangement 1 can be part of a security relay or a security control of a security-critical system. Such security relays or security controllers must be able to tolerate and recognize the error models described in the standards EN ISO 13849, DIN EN 61508 or DIN EN 62061.

The data processing unit 10 is preferably a security controller or a security microcontroller and controls the process via data connections shown as an arrow and the inputs and outputs 40, 42, 50, 52. In particular, the data processing unit 10 communicates via a serial bus SPI (Serial Peripheral Interface). SPI is a bus system for a synchronous serial data bus with which digital circuits can be interconnected according to the master-slave principle.

Between the data processing unit 10 and the converters 20, 22, 24, 30, 32, 34, 70, a coupling unit 60 is interposed, which performs a galvanic separation between the data processing unit 10 and the real process. This increases the security of the overall system. Thanks to the serial data transmission with the data processing unit 10, only one coupling unit 60 for galvanic separation of all inputs and outputs 40, 42, 50, 52 is necessary. This reduces the material and space requirements for the security arrangement 1. In particular, the coupling unit 60 comprises at least one galvanic separating element, in particular two optocouplers or digital isolators, one for each of the two data transmission directions.

The serial-to-parallel converters 30, 32, 34 each comprise a shift register and convert the incoming serial data into parallel data 54, with which the outputs 50, 52 are controlled. In this case, the output 50 can output, for example, control information for the real process. The output 52 may provide, for example, clock outputs of the real process. The sliding direction of the shift registers of the serial-to-parallel converters 30, 32, 34 is indicated by arrow 38 (cf. FIG. 2). If desired, further serial-to-parallel converters can be connected in series with the serial-to-parallel converters 30, 32, 34.

Accordingly, the parallel-to-serial converters 20, 22, 24 each comprise a shift register and convert the incoming parallel data 44, with which the inputs 50, 52 are queried, into serial data, which are forwarded to the data processing unit 10. In this case, the 30 input 40 can receive, for example, process data of the real process. The input 42 may receive, for example, status or diagnostic information of the real process. The sliding direction of the shift registers of the parallel-to-serial converter 20, 22, 24 is indicated by arrow 28 (cf. FIG. 2). If desired, further parallel-to-serial converters can be connected in series with the parallel-to-serial converters 20, 22, 24.

The analog-to-digital and digital-to-analog, respectively, converter 70 can, on the one hand, convert and output digital control signals into analog control signals for the real process. On the other hand, it can also receive analog process signals of the real process and convert them into digital process signals for forwarding to the data processing unit 10.

FIG. 2 schematically shows the operation of the security arrangement 1, wherein for checking the data security, data consistency and/or freedom from error of the data to be transmitted and the transmission chain diagnostic bits are inserted into the data stream 12. The check is carried out by the data processing unit 10. The diagnostic bits are output by one or more or all of the serial-to-parallel converters 30, 32, 34. These diagnostic bits are read back together with the user data from one or more or all of the parallel-to-serial converters 20, 22, 24 in a data stream 13 and then checked for errors by the data processing unit 10. At least the diagnostic bits must be transmitted in the data stream 13. However, the number of user data in the data stream 13 is arbitrary. In particular, each one of the parallel-to-serial converters 20, 22, 24 reads the diagnostic bits of a particular one of the serial-to-parallel converters 30, 32, 34 to have them checked. In the example shown, the parallel-to-serial converter 20 reads out the diagnostic bits of the serial-to-parallel converter 32 from the data stream, as symbolized by arrow 14. Accordingly, the parallel-to-serial converter 24 reads out the diagnostic bits of the serial-to-parallel converter 30 from the data stream, as symbolized by arrow 16; and the parallel-to-serial converter 22 reads out the diagnostic bits of the serial-to-parallel converter 34 from the data stream, as symbolized by arrow 18. Here, arrow 36 symbolizes the output of diagnostic bits by the serial-to-parallel converter 34 and arrow 26 symbolizes the read-back of diagnostic bits by the parallel-to-serial converter 20.

Accordingly, the inputs of the parallel-to-serial converters 20, 22, 24 are connected to the outputs of the serial-to-parallel converters 30, 32, 34.

The diagnostic bits may be in the form of a test pattern, that is to say a plurality of diagnostic bits, which are reliably detected by the parallel-to-serial converters 20, 22, 24 and the data processing unit 10 and differ from the user data. The test patterns may have a different bit length. They can furthermore be output at different bit positions of the serial data stream. It is also possible that the test patterns are read in inverted for output. If there is no inversion during reading in, an error must be present. The test patterns can furthermore be changed dynamically. This change can be made for each transmission cycle of the security arrangement 1. All of these measures increase the data security and the probability that an erroneous data transmission or a defect of the components within the transmission chain is detected.

Each serial-to-parallel converter 30, 32, 34 can output a preferably individual test pattern. However, it is also possible for one or more of the serial-to-parallel converters 30, 32, 34 to output no test pattern or no diagnostic bits.

The read-back data with the diagnostic bits are then transmitted via the coupling unit 60 to the data processing unit 10, where the checking of the data for errors takes place. The data processing unit compares the received diagnostic bits and test pattern, respectively, against an expected value, i.e. the expected, correct diagnostic bits. If the read-back diagnostic bits match with the expected value, it can be assumed with high certainty that the entire data transmission has taken place without error. If the diagnostic bits read back do not match the expected value, there is a faulty data transmission or a defect of a component. In this case, the data processing unit 10 will put the system in a secure state to avoid any damage.

The data processing unit 10 can preferably carry out the transmission of the data by means of direct memory accesses, in particular DMA transfers, within the data processing unit. The data processing unit 10 preferably performs the comparison of the diagnostic bits transmitted by means of DMA transfer, in particular the test patterns, against the expected value. This reduces the interrupt load of the data processing device 10 and overall increases the performance of the security arrangement 1.

LIST OF REFERENCE NUMBERS 1 security arrangement
10 data processing unit, security controllers
12, 13 data stream
14, 16, 18 assignment of read-back
20, 22, 24 parallel-to-serial converter
26 reading back of diagnostic bits
28 shifting direction of shift registers
30, 32, 34 serial-to-parallel converter
36 output of diagnostic bits
38 shifting direction of shift registers
40 process data input
42 input for status or diagnostic information
44 parallel data
50 output for control information
52 clock outputs
54 parallel data
60 coupling unit
70 analog-to-digital or digital-to-analog converter

The invention claimed is:

1. An arrangement comprising:
a data processing unit for serial transmission of data for controlling outputs and for querying inputs of a process;
a parallel-to-serial converter, comprising a shift register for converting data to query the inputs;
a serial-to-parallel converter comprising a shift register for converting data to control the outputs; and a coupling unit, connected downstream of the data processing unit, disposed between the data processing unit and the serial-to-parallel converter and the parallel-to-serial converter, said coupling unit being configured to perform galvanic separation between the data processing unit and the serial-to-parallel converter, the coupling unit including:
    a first optocoupler for galvanic separation of data input to the serial-to-parallel converter; and
    a second optocoupler for galvanic separation of data output from the serial-to-parallel converter,
wherein the data to be transmitted includes diagnostic bits that are output from the serial-to-parallel converter and read back from the parallel-to-serial converter, and
wherein the read-back data is checked for errors by the data processing unit to ensure a secure data transmission.

2. The arrangement according to claim 1, wherein the data processing unit is a security controller.

3. The arrangement according to claim 1, further comprising a plurality of serially connected serial-to-parallel converters and/or a plurality of serially connected parallel-to-serial converters.

4. The arrangement according to claim 3, wherein each of the serial-to-parallel converters outputs diagnostic bits and/or each of the parallel-to-serial converters reads back diagnostic bits.

5. The arrangement according to claim 1, wherein the diagnostic bits represent a test pattern of bits.

6. The arrangement according to claim 1, wherein the diagnostic bits are output at different bit positions of a serial data stream.

7. The arrangement according to claim 1, wherein the diagnostic bits are read in inverted from the parallel-to-serial converter.

8. The arrangement according to claim 1, wherein the diagnostic bits are changed dynamically.

9. The arrangement according to claim 1, wherein the data processing unit is adapted to perform a comparison of the diagnostic bits against an expected value and to initiate a secure state of the process upon detection of an error.

10. The arrangement according to claim 9, wherein the data processing unit is adapted to perform the comparison of the diagnostic bits against an expected value by means of direct memory accesses within the data processing unit.

11. The arrangement according to claim 1, wherein the security arrangement comprises only one coupling unit.

12. A method for serial transmission of data for controlling outputs of a process, comprising:
    serial transmission of data, through a coupling unit, for controlling outputs and for querying inputs of a process by means of a data processing unit;
    converting data to query the inputs by means of at least one parallel-to-serial converter comprising a shift register;
    converting data for controlling the outputs by means of at least one serial-to-parallel converter comprising a shift register;
    reading back the data output from the serial-to-parallel converter by means of the parallel-to-serial converters, wherein the data to be transmitted include diagnostic bits; and
    error checking of the read-back data by means of the data processing unit to ensure a secure data transmission,
    wherein said coupling unit is connected downstream of the data processing unit, disposed between the data processing unit and the at least one serial-to-parallel converter and the at least one parallel-to-serial converter, said coupling unit being configured to perform galvanic separation between the data processing unit and the serial-to-parallel converter, the coupling unit including:
        a first optocoupler for galvanic separation of data input to the serial-to-parallel converter; and
        a second optocoupler for galvanic separation of data output from the serial-to-parallel converter.

13. The method according to claim 12, wherein the diagnostic bits are transmitted as test patterns and are changed dynamically.

14. The method according to claim 12, wherein the diagnostic bits are output at different bit positions of a serial data stream; and/or are output inverted.

* * * * *